United States Patent
Doy et al.

(10) Patent No.: US 12,210,348 B2
(45) Date of Patent: Jan. 28, 2025

(54) COMPACTION PATTERN ADJUSTMENTS FOR AUTOMATED COMPACTION

(71) Applicant: Caterpillar Paving Products Inc., Brooklyn Park, MN (US)

(72) Inventors: Nathaniel S. Doy, Maple Grove, MN (US); John L. Marsolek, Watertown, MN (US); David Edwin Gerding, Maple Grove, MN (US); Rolf af Klinteberg, Kallekarr (SE); Robert J. McGee, Clayton, NC (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 127 days.

(21) Appl. No.: 17/564,508

(22) Filed: Dec. 29, 2021

(65) Prior Publication Data
US 2023/0205215 A1    Jun. 29, 2023

(51) Int. Cl.
*G05D 1/00*    (2024.01)
*G07C 3/08*    (2006.01)
*E01C 19/26*    (2006.01)

(52) U.S. Cl.
CPC ......... *G05D 1/0219* (2013.01); *G05D 1/0214* (2013.01); *G05D 1/0289* (2013.01); *G07C 3/08* (2013.01); *E01C 19/26* (2013.01)

(58) Field of Classification Search
CPC ......... G05D 2201/0202; G05D 1/0219; G05D 1/0289
See application file for complete search history.

(56) References Cited

U.S. PATENT DOCUMENTS

| | | | |
|---|---|---|---|
| 10,640,943 B2 | 5/2020 | Marsolek et al. | |
| 10,676,879 B2 | 6/2020 | Laugwitz | |
| 11,054,831 B2 | 7/2021 | O'Donnell et al. | |
| 2020/0064863 A1* | 2/2020 | Tomita | G05D 1/0297 |
| 2020/0103906 A1* | 4/2020 | O'Donnell | G05D 1/0278 |
| 2021/0088354 A1* | 3/2021 | Anderson | G06F 3/167 |
| 2022/0106769 A1* | 4/2022 | Takaoka | E02F 3/841 |
| 2022/0374019 A1* | 11/2022 | Tahiliani | G05D 1/0214 |
| 2023/0081037 A1* | 3/2023 | Kertai | A01B 69/008 |
| 2023/0367333 A1* | 11/2023 | Hoellinger | G05D 1/0297 |

FOREIGN PATENT DOCUMENTS

| | | |
|---|---|---|
| CN | 111459163 | 7/2020 |
| DE | 102014007783 | 11/2015 |

OTHER PUBLICATIONS

Machine translation DE 102014007783 (Year: 2015).*

* cited by examiner

*Primary Examiner* — Anne Marie Antonucci
*Assistant Examiner* — Jordan T Smith

(57) ABSTRACT

A method for controlling a construction machine can include dividing a work area into a plurality of work lanes; selecting a first set of consecutive work lanes of the plurality of work lanes that can be worked without an obstruction; and completing one or more passes on the selected first set of consecutive work lanes before moving on to another set of the plurality of work lanes.

19 Claims, 3 Drawing Sheets

COMPACTION PATTERN ADJUSTMENTS FOR AUTOMATED COMPACTION

TECHNICAL FIELD

This disclosure relates to road construction equipment, and more specifically to a system and method for controlling a construction machine.

BACKGROUND

Compactors are machines used to compact initially loose materials, such as asphalt, soil, gravel, and the like, to a densified and more rigid mass or surface. For example, soil compactors are utilized to compact soil at construction sites and on landscaping projects to produce a foundation on which other structures may be built. Most soil compactors include a rotatable roller drum that may be rolled over the surface to compress the material underneath. In addition to utilizing the weight of the roller drum to provide the compressive forces that compact the material, some compactors are configured to also induce a vibratory force to the surface.

Autonomous worksites can employ a plurality of autonomous machines to perform a variety of tasks that may be controlled by a combination of on-board and off-board computers, processors, and other electronic controllers rather than human operators. As a result, autonomous operation may enhance the productivity of the machines, and reduce the human resources required for controlling the operation of the worksite. Construction site planning for autonomous construction vehicles involves determining the path a construction vehicle will take.

For example, an automated compaction system executes the compacting process in the most technically correct way to achieve desired compaction. Thus, a pass is taken (forward/reverse) in the first compaction lane, then the machine moves over and does a pass in the second compaction lane, then continues across the work area before completing additional passes on each lane. This system works fine for the work areas where the compactor is the only machine, but if another machine is preparing the surface to compact (dozer, grader, or mixer) and only a subset of the lanes is available for compaction, the compactor must wait. This is undesirable due to reduced productivity and for soil stabilization applications where the compactor must complete work relatively soon after the mixer.

German Patent DE102014007783 discusses a process for compacting hot asphalt.

SUMMARY

In an example according to this disclosure, a method for controlling a construction machine can include dividing a work area into a plurality of work lanes; selecting a first set of consecutive work lanes of the plurality of work lanes that can be worked without an obstruction; and completing one or more passes on the selected first set of consecutive work lanes before moving on to another set of the plurality of work lanes.

In another example, a system for autonomous construction can include a controller configured to divide a work area into a plurality of work lanes and define a pass pattern for a construction machine in view of a number of the plurality of work lanes and a number of passes required; the controller configured to select a first set of consecutive work lanes of the plurality of work lanes that can be worked without an obstruction; and after the first set of consecutive work lanes are completed, the controller configured to adjust the pass pattern and select a second set of consecutive work lanes.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
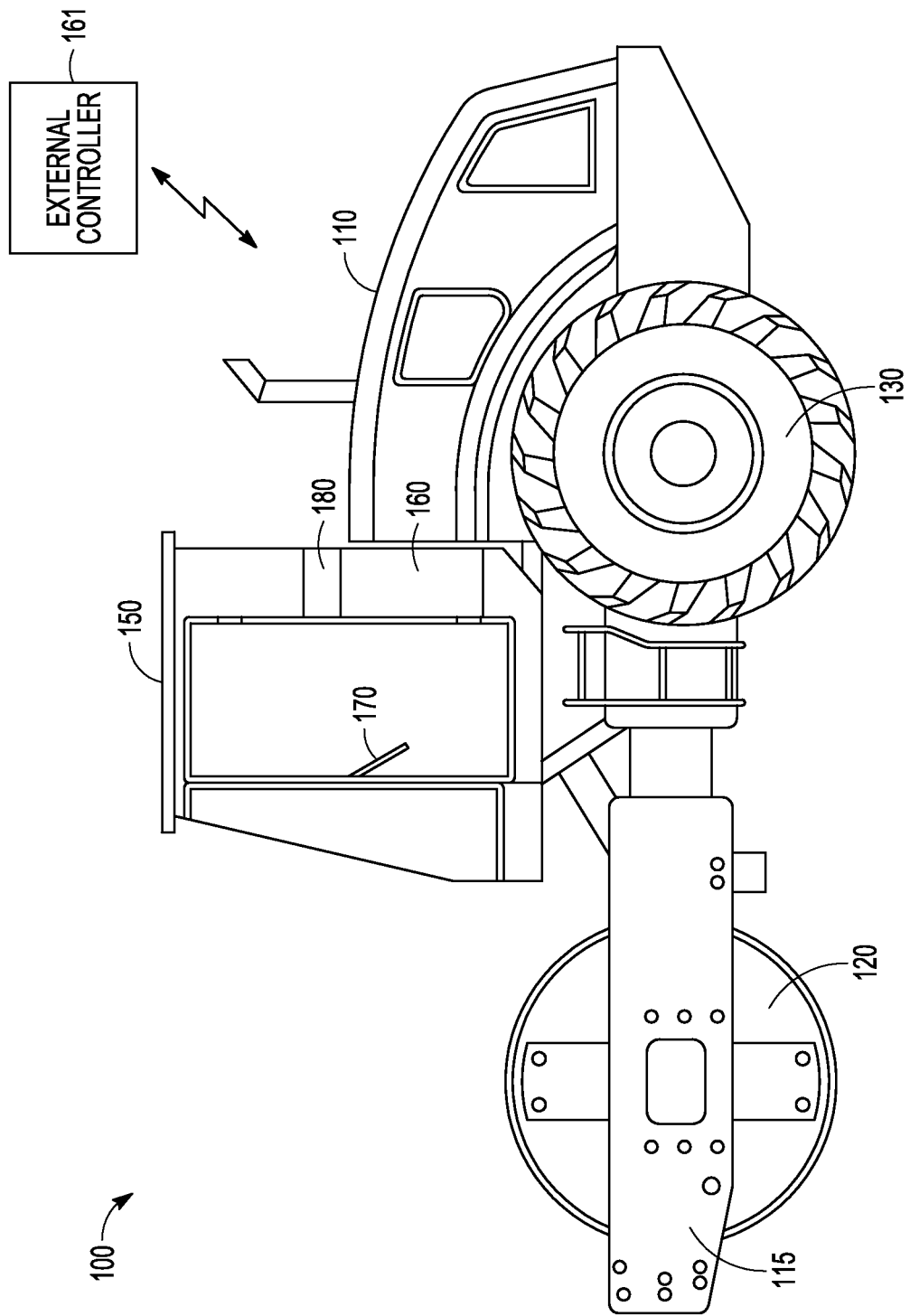
FIG. 1 shows a side view of a compactor machine, in accordance with one embodiment.

FIG. 1 shows a side view of a construction machine, such as a soil compactor machine 100, in accordance with one embodiment. It is noted that in some embodiments, the present system can be utilized in different construction machines but will be described in terms of the compactor machine 100. The compactor machine 100 generally includes a body or machine frame 110 that connects and associates the various physical and structural features that enable the compactor machine 100 to function. These features can include an operator's cab 150 that is mounted on top of the machine frame 110 from which an operator may control and direct operation of the compactor machine 100. Accordingly, a steering feature and similar controls may be located within the operator's cab 150. To propel the compactor machine 100 over a surface, a power system such as an internal combustion engine can also be mounted to the machine frame 110 and can generate power that is converted to physically move the machine.

Compactor machine 100 can include at least one cylindrical roller drum 120 which is rotatable about a drum axis oriented generally transverse to a direction of travel of the compactor machine 100. The roller drums 120 is attached to the machine frame 110 using drum supports 115. The soil compactor machine 100 articulates such that the back section including wheels 130 can articulate relative to the front section including the cylindrical drum 120.

In this example, the compactor machine 100 can travel over a surface compacting a work material, for example, loose soil. Other types of compactors are contemplated to implement the disclosed process including asphalt compactors and vibratory compactors, for example. Moreover, the compactor machine can include either one or two roller.

Compactor machine 100 can be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 100 and that may cooperate to sense various functions, operations, and operating characteristics of the machine and/or aspects of the environment in which the machine is operating.

The compactor machine can further include a controller 160, a position system 180, such as a GPS, and a user display 170. The overall operation of the compactor machine 100 within a worksite can be managed by the vehicle controller 160 on the compactor machine 100 or an external controller 161 that is in communication with the compactor machine 100. Moreover, each other construction vehicle on a work site can include any one or more of a variety of feedback devices capable of signaling, tracking, monitoring, or otherwise communicating relevant machine information to a base station. For example, each machine can include a locating device configured to communicate with the external controller 161 via any of a variety of technology communication mechanisms to communicate various information pertaining to the position and/or orientation of the machine relative to the construction site.

The vehicle controller 160 may receive input signals (manual inputs) from an operator operating the compactor machine 100 from within cab 150 (e.g., via a user interface, the user display 170, controls, or the like) or off-board through a wireless communications system, e.g., external controller 161. The vehicle controller 160 or the external controller 161 may control the operation of various aspects of the compactor machine 100 including, for example, the drivetrain and the hydraulic systems.

The vehicle controller 160 may be an electronic controller that performs operations, executes control algorithms, stores, and retrieves data and other desired operations. The vehicle controller 160 may include, or access, memory, secondary storage devices, processors, and any other components for running an application. The memory and secondary storage devices may be in the form of read-only memory (ROM) or random-access memory (RAM) or integrated circuitry that is accessible by the controller. Various other circuits may be associated with the vehicle controller 160 such as power supply circuitry, signal conditioning circuitry, driver circuitry, and other types of circuitry.

The vehicle controller 160 may be a single controller or may include more than one controller disposed to control various functions and/or features of the compactor machine 100. The term "controller" is meant to be used in its broadest sense to include one or more controllers and/or microprocessors that may cooperate in controlling various functions and operations of the compactor machine 100. The functionality of the controller 160 may be implemented in hardware and/or software without regard to the functionality. The controller 160 may rely on one or more data maps relating to the operating conditions and the operating environment of the machine 100 and a construction site that may be stored in memory. Each of these data maps may include a collection of data in the form of tables, graphs, digital images and/or equations.

External controller 161 can also include or access memory, secondary storage devices, processors, and any other components for running an application. Control of the compactor machine 100 may be implemented in any number of different arrangements. For example, all control can be done by the vehicle controller 160, or control can be at least partially implemented at external controller 161 situated locally and/or remotely relative to the construction site with sufficient means for communicating with the compactor machine 100, via any of a variety of wireless communication systems, for example via a satellite, or the like. Using any of the foregoing arrangements, external controller 161 may generally be configured to monitor the position of the compactor machine 100 relative to the construction site and a predetermined target compaction operation and provide instructions for controlling the compactor machine 100 in an efficient manner to compact the surface. In at least one example, the external controller 161 may wirelessly communicate a construction site plan to the vehicle controller 160.

Compactor machine 100 may be configured to be operated autonomously, semi-autonomously, or manually. When operating semi-autonomously or manually, the compactor machine 100 may be operated by remote control and/or by an operator physically located within the cab 150.

The vehicle controller 160 can include a sensing system configured to sense the position of the machine relative to the construction site. The sensing system can include a plurality of individual sensors that cooperate to generate and provide position signals to the vehicle controller 160 indicative of the position and orientation of the compactor machine 100. In one example, the position system 180 may include one or more sensors that interact with a positioning system such as a global navigation satellite system or a global positioning system to operate as a position sensor.

The vehicle controller 160 may use position signals from the position system 180 to determine the position of the compactor machine 100 within a construction site. In other examples, the position system 180 can include a perception-based system, or may use other systems such as lasers, sonar, or radar to determine all or some aspects of the position and orientation of the compactor machine 100.

As noted above, autonomous worksites can employ a plurality of autonomous machines to perform a variety of tasks that may be controlled by a combination of on-board and off-board controllers rather than human operators. As a result, autonomous operation can enhance the productivity of the machines, and reduce the human resources required for controlling the operation of the worksite.

For example, construction site planning for a compactor machine involves determining the path the compactor machine will take. The simplest pass pattern is when a pass is taken (forward/reverse) in the first compaction lane, then the machine moves over and does a pass in the second compaction lane, then continues across the work area before completing additional passes on each lane. As noted above, this system works fine for the work areas where the compactor is the only machine, but if another machine is preparing the surface to compact (dozer, grader, or mixer) and only a subset of the lanes is available for compaction the compactor must wait. This is undesirable due to reduced productivity and for soil stabilization applications where the compactor must complete work relatively soon after the mixer. Currently, the compactor machine can pause and resume during the compacting plan, which works when a single pass is required. However, when more passes are required, a different solution is required.

The present system relates to a method for adjusting a compaction pattern for an automated compaction machine, or more generally for adjusting a working pattern for a construction machine. As will be discussed below, the method can include selecting a plurality of construction lanes by using a user interface. Further, the method can include specifying a number of passes for the construction machine on each work lane using an increment/decrement widget of the user interface. In operation, for example, the compaction machine completes specified passes in each selected compaction lane(s) before continuing to a next selected compaction lane(s).

Figure 2:
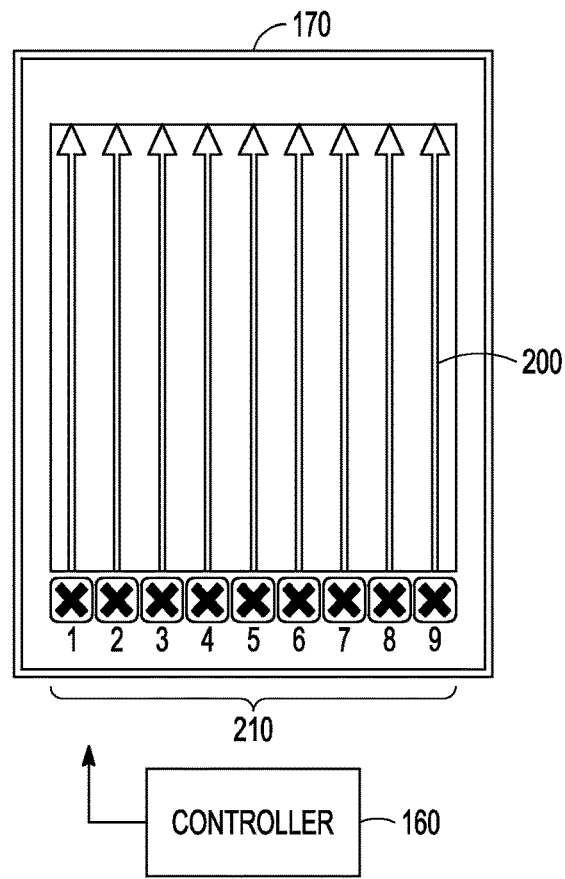
FIG. 2 shows schematic view of a work area on a user display, in accordance with one embodiment.

FIG. 2 shows a schematic view of a work area 200 on the user display 170 in accordance with one embodiment. The work area 200 can be shown on the user display 170, allowing for reference and user input for controlling and adjusting the pass pattern for the compactor machine 100. The display 170 can be operatively connected to the controller 160 to send and receive information.

When the site plan calls for a certain number of passes by the compactor machine, a pass pattern for the compactor machine 100 (FIG. 1) can be developed in view of the number of a plurality of work lanes 210 and the number of passes required. For example, in the example work area 200, there are nine work lanes marked 1-9. For example, the compactor machine may have to go up and back (one pass), then move over and repeat until the end lane is finished. If multiple passes are needed, the compactor machine can then retrace its path to the beginning point. In other words, without any obstructions, the pattern would be to do work lanes 1, 2, 3 and so on up to lane 9 and then lanes 9, 8, 7, 6 and so on back to lane 1.

In this example, each of the plurality of work lanes 210 is approximately equal in width and in total cover the entire work area 200. The controller 160 can know the work area 200 from a work site plan input and can know the width of the compactor roller and then divides the work area 200 into the required number of work lanes 210.

Figure 3:
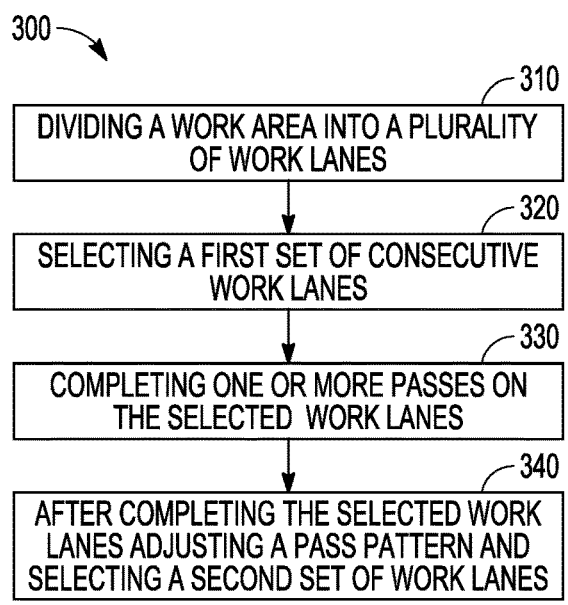
FIG. 3 shows a method for controlling a compactor machine, in accordance with one embodiment.

FIG. 3 shows a method (300) for controlling a construction machine. The method (300) can include dividing the work area (310) into a plurality of work lanes. The method (300) then includes selecting a first set (320) of consecutive work lanes of the plurality of work lanes that can be worked without an obstruction. The method (300) further includes completing one or more passes (330) on the selected work lanes before moving on to another set of the plurality of work lanes. The method can further include adjusting the pass pattern (340) after completing the one or more passes on the selected work lanes by selecting a second set of consecutive work lanes.

Figure 4:
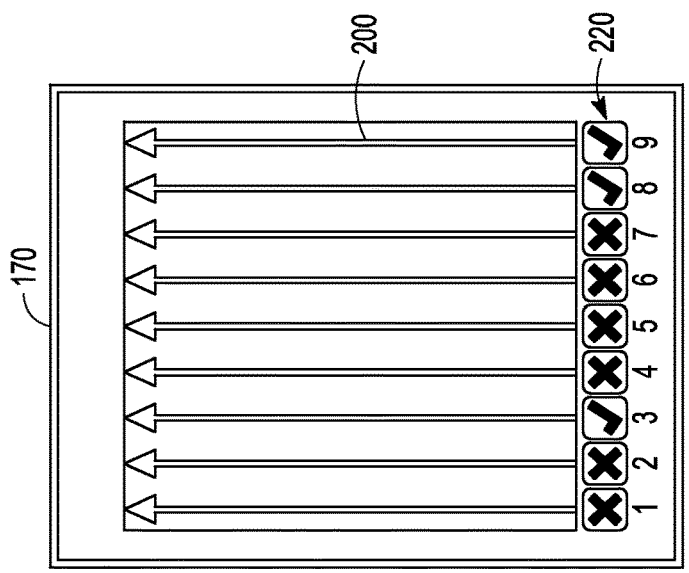
FIG. 4 shows a view of a user display, in accordance with one embodiment.
Figure 5:
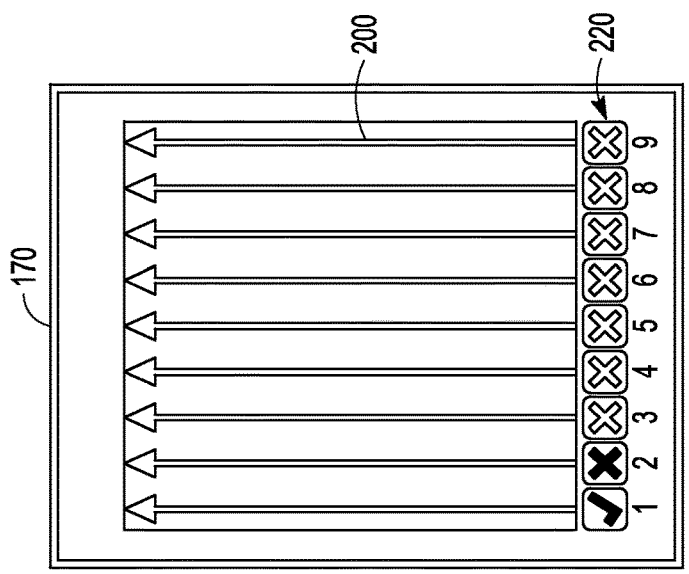
FIG. 5 shows another view of the user display, in accordance with one embodiment.
Figure 6:
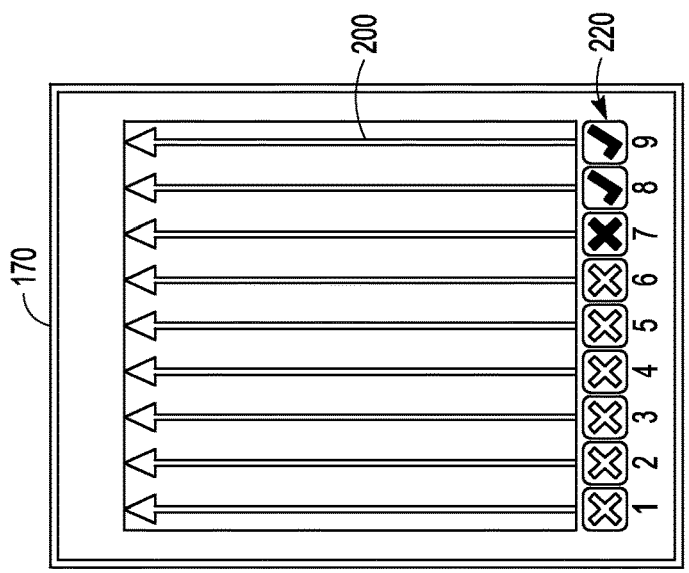
FIG. 6 shows another view of the user display, in accordance with one embodiment.

Referring to FIGS. 4, 5, and 6, which show example displays 170 of the work area 200, the method step (320) for selecting a first set of consecutive work lanes of the plurality of work lanes can include selecting any one or more consecutive lanes that can be worked without having to pause. The obstruction can include another work machine in the work area 200 or when another work machine has not prepared a surface of the work area for compacting yet.

In one example, the display 170 can include user interface selection boxes 220 for the user to utilize. In the examples of FIGS. 4-6, in FIG. 4, lanes 8 and 9 are selected. In FIG. 5, lane 1 is selected, and FIG. 6 shows a selection that would not be made since selected lanes 3, 8, and 9 are not consecutive. The goal is to selectively execute consecutive lanes only. This ensures all passes are executed logically. For example, the FIG. 6 would result in a need to mobilize across four uncompacted lanes after every two passes.

Here, the selected work lanes can be any number of consecutive work lanes (i.e., adjacent to each other). The consecutive lanes can be on the ends or in the middle of the work area 200.

After the machine completes the one or more passes (330) on the selected work lanes, the method further includes adjusting the pass pattern (340) after completing the one or more passes on the selected work lanes by selecting a second set of consecutive work lanes.

In some examples, adjusting the pass pattern can include doing more passes (if needed) on the same set of lanes as just completed (if the obstruction still there, for example).

In one example, after completing the selected work lanes, the system can pause and save the work area progress and then select a new plurality of work lanes.

In some examples, the second set of consecutive work lanes can be adjacent to the first set of work lanes or can be a distance from the first set. For example, the second set can be farther away on the work area 200 or can be in a different work area altogether, depending on what is most efficient so there is minimal idle time.

In one example, completing the one or more passes on the selected work lanes includes completing all needed passes in the selected work lanes before pausing and adjusting. Otherwise, the method can complete just a portion of all the needed passes if the site plan calls for finishing a certain number of passes on the whole work area before doing more passes. Basically, the method allows for a pass reordering from the original site plan.

In one example, the display 170 can further include an increment counter in the selection boxes 220, where each work lane 210 can include a number under it that decrements as each pass is accomplished. Thus, the selection boxes 220 can become increment/decrement widgets. This allows the operator to select a specific number of passes for each compaction lane.

Thus, the system keeps track of which of the plurality of work lanes 210 of the work area 200 have been passed and how many passes there have been on each of the work lanes 210.

Thus, for example, instead of simply going up the work area in the order 1, 2, 3, . . . 9, then down 9, 8, 7 . . . 1, the present system allows for adjusting on the fly so the compactor machine may do work lanes 1, 2, and 3, and then jump to work lanes 7, 8, and 9, then do lanes 4, 5, and 6, for example. If multiple passes are needed, the system controller can also decrement the counter each pass so the system knows what is left to be done and can jump around doing the most efficient pattern (the least work pauses) in view of any obstructions. In other words, the system keeps track of which lanes and how many passes have been done.

INDUSTRIAL APPLICABILITY

The present system is applicable during many situations in road construction. For example, the present system can be used for adjusting pass patterns for any compactor machine. Moreover, in some embodiments, the present system can be utilized in different construction machines and construction applications. Some other examples can be dozing, grading, scarification, reclamation, and planing, and the system can also be useful for certain trenching, watering, hammering, drilling, brushing, and face-cutting applications.

The present disclosure provides a system for adjusting a compaction pattern for an automated compaction machine. The system can include selecting a plurality of work lanes by using a user interface. Further, the system can include specifying a number of passes for the construction machine on each work lane using an increment/decrement widget of the user interface. In operation, the constructor machine can complete specified passes in each selected work lane(s) before continuing to a next set of selected work lane(s).

In general, and referring to FIGS. 1 and 2, a system for autonomous compaction can include the controller 160 being configured to divide the work area 200 into a plurality of work lanes 210 and define a pass pattern for the compactor machine 100 in view of the number of the plurality of pass lanes and the number of passes required. The controller 160 can be configured to select a first set of consecutive work lanes of the plurality of work lanes 210 that can be compacted without an obstruction, and after the first set of consecutive work lanes are completed, the controller 160 can be configured to adjust the pass pattern and select a second of consecutive work lanes As discussed above, the second set of consecutive work lanes can be adjacent to the first set of work lanes or a distance away from the first set of work lanes. In one example, the compactor machine completes all needed passes in the selected work lanes before moving to another set of work lanes. The controller 160 can be configured to keep track of which of the plurality of work lanes 210 of the work area 200 have been passed and how many passes there have been on each of the work lanes 210.

The first set of consecutive work lanes 210 can be in a middle of the work area 200 or on an end of the work area 200. After the compactor machine 100 completes the selected work lanes, the controller 160 pauses and saves the work area progress. The controller 160 can adjust the pass pattern by doing any more needed passes in the first set or moving to a second set of selected work lanes.

For the purposes of this disclosure, "autonomous" means both "autonomous and "semi-autonomous" such that an autonomous construction vehicle may include a fully autonomous construction vehicle or semi-autonomous construction vehicle which is controlled by a predetermined construction site plan designating the path that the construction vehicle is to take within a worksite boundary. In some examples, "autonomous" may include vehicles with an operator in the vehicles for a manned operation.

Various examples are illustrated in the figures and description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A method for controlling an autonomous soil compactor machine, comprising:
    preparing a work plan for a single soil compactor machine to compact an entire work area;
    dividing the work area into a plurality of work lanes to be compacted by the single soil compactor machine;
    before performing any compacting, selecting a first set of consecutive work lanes of the plurality of work lanes that can be worked without an obstruction, wherein the obstruction includes a temporary obstruction in one or more of the plurality of work lanes that will be removed and where the single soil compactor machine will later be compacting, wherein the temporary obstruction includes a machine of a different type than the soil compactor machine and includes at least one of a dozer, a mixer, or a grader, wherein the first set of consecutive work lanes is less than a total of the plurality of work lanes;
    based on a location of the selected first set of consecutive work lanes, a controller autonomously operating the soil compactor to complete two or more passes on each of the work lanes of the selected first set of consecutive work lanes, wherein the two or more passes on each of the work lanes include all of the necessary passes required for compacting all of the work lanes in the first set of consecutive work lanes;
    after finishing compacting the first set of consecutive work lanes, selecting a second set of consecutive work lanes of the plurality of work lanes that can be worked without a temporary obstruction;
    the controller autonomously operating the soil compactor to complete two or more passes on each of the work lanes of the selected second set of consecutive work lanes, wherein the two or more passes on each of the work lanes include all of the necessary passes required for compacting all of the work lanes in the second set of consecutive work lanes; and
    continuing to select sets of work lanes to be compacted until all of the plurality of work lanes in the entire work area, including the work lanes having the temporary obstructions, have been compacted by the single autonomous soil compactor.

2. The method of claim 1, wherein after dividing the work area, defining a pass pattern for the construction machine in view of a number of the plurality of work lanes and a number of passes required.

3. The method of claim 2, further comprising adjusting the pass pattern by doing more passes on the first set of selected work lanes after completing the two or more passes on the first set of selected work lanes.

4. The method of claim 1, wherein each of the plurality of work lanes is approximately equal in width.

5. The method of claim 1, wherein the second set of consecutive work lanes are adjacent to the first set of work lanes.

6. The method of claim 1, wherein the second set of consecutive work lanes are a distance away from the first set of work lanes.

7. The method of claim 1, wherein completing the two or more passes on the selected work lanes includes completing all needed passes in the selected work lanes.

8. The method of claim 1, wherein the obstruction includes another work machine in the work area or another work machine has not prepared a surface of the work area for construction yet.

9. The method of claim 1, further including keeping track of which of the plurality of work lanes of the work area have been passed and how many passes there have been on each of the plurality of work lanes by including an increment counter in a display of the work area for each of the work lanes in the plurality of work lanes, wherein in the increment counter each work lane in the plurality of work lanes includes a number of passes required which decrements as each pass is accomplished in each work lane.

10. The method of claim 1, wherein the first set of consecutive work lanes are in a middle of the work area or on an end of the work area.

11. The method of claim 1, wherein after completing the selected work lanes, pausing, and saving the work area progress.

12. A system for autonomous construction comprising:
    a controller configured to divide a work area into a plurality of work lanes and define a pass pattern for a single soil compactor in view of a number of the plurality of work lanes and a number of passes required;
    before performing any compacting, the controller configured to select a first set of consecutive work lanes of the plurality of work lanes that can be worked without an obstruction, wherein the obstruction includes a temporary obstruction in one or more of the plurality of work lanes that will be removed and where the single soil compactor machine will later be compacting, wherein the temporary obstruction includes a machine of a different type than the soil compactor machine and includes at least one of a dozer, a mixer, or a grader, wherein the first set of consecutive work lanes is less than a total of the plurality of work lanes;

the controller autonomously operating the soil compactor to complete two or more passes on each of the work lanes of the selected first set of consecutive work lanes, wherein the two or more passes on each of the work lanes include all of the necessary passes required for compacting all of the work lanes in the first set of consecutive work lanes;

after the first set of consecutive work lanes are completed, the controller configured to adjust the pass pattern and select a second set of consecutive work lanes;

the controller autonomously operating the soil compactor to complete two or more passes on each of the work lanes of the selected second set of consecutive work lanes, wherein the two or more passes on each of the work lanes include all of the necessary passes required for compacting all of the work lanes in the second set of consecutive work lanes; and continuing to select sets of work lanes to be compacted until all of the plurality of work lanes in the entire work area, including the work lanes having the temporary obstructions, have been compacted by the single autonomous soil compactor.

13. The system of claim 12, wherein the second set of consecutive work lanes are adjacent to the first set of work lanes.

14. The system of claim 12, wherein the second set of consecutive work lanes are a distance away from the first set of work lanes.

15. The system of claim 12, wherein the obstruction includes another work machine in the work area or another work machine has not prepared a surface of the work area for working yet.

16. The system of claim 12, further including an increment counter in a display of the work area for each of the work lanes in the plurality of work lanes, wherein the controller is configured to keep track of which of the plurality of work lanes of the work area have been passed and how many passes there have been on each of the plurality of work lanes, wherein in the increment counter each work lane in the plurality of work lanes includes a number of passes required which decrements as each pass is accomplished in each work lane.

17. The system of claim 12, wherein the first set of consecutive work lanes are in a middle of the work area or on an end of the work area.

18. The system of claim 12, wherein after the selected work lanes are completed, the autonomous construction pauses and the work area progress is saved.

19. The system of claim 18, wherein the controller adjusts the pass pattern by instructing the machine to do any more needed passes on the first set of work lanes or moving to a second set of selected work lanes.

* * * * *